United States Patent
Kawamoto et al.

(10) Patent No.: US 8,688,633 B2
(45) Date of Patent: Apr. 1, 2014

(54) CONTENT SEARCH DEVICE, CONTENT SEARCH METHOD, PROGRAM

(75) Inventors: Takuji Kawamoto, Aichi (JP); Yoshiaki Iwata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/502,586

(22) PCT Filed: Aug. 10, 2011

(86) PCT No.: PCT/JP2011/004517
§ 371 (c)(1),
(2), (4) Date: Apr. 18, 2012

(87) PCT Pub. No.: WO2012/032711
PCT Pub. Date: Mar. 15, 2012

(65) Prior Publication Data
US 2012/0209806 A1    Aug. 16, 2012

(30) Foreign Application Priority Data
Sep. 6, 2010   (JP) .................................. 2010-199126

(51) Int. Cl.
*G06F 17/00*    (2006.01)
(52) U.S. Cl.
USPC ........................................................ 707/610
(58) Field of Classification Search
USPC ........................................................ 707/610
See application file for complete search history.

(56) References Cited

U.S. PATENT DOCUMENTS

| | | | |
|---|---|---|---|
| 2003/0093551 A1* | 5/2003 | Taylor et al. | 709/237 |
| 2005/0198385 A1* | 9/2005 | Aust et al. | 709/245 |
| 2006/0230183 A1 | 10/2006 | Zhu et al. | |
| 2007/0100807 A1* | 5/2007 | Abe et al. | 707/3 |
| 2008/0005184 A1* | 1/2008 | Myllyla et al. | 707/200 |
| 2008/0005195 A1* | 1/2008 | Li | 707/203 |
| 2008/0126543 A1* | 5/2008 | Hamada et al. | 709/225 |
| 2009/0216815 A1* | 8/2009 | Braginsky et al. | 707/203 |
| 2009/0327288 A1* | 12/2009 | Silverman et al. | 707/6 |
| 2010/0174680 A1* | 7/2010 | Yamagishi et al. | 707/622 |

FOREIGN PATENT DOCUMENTS

| | | |
|---|---|---|
| JP | 2006-295918 | 10/2006 |
| JP | 2008-124770 | 5/2008 |
| JP | 2010-103622 | 5/2010 |

OTHER PUBLICATIONS

International Search Report issued Oct. 11, 2011 in corresponding International Application No. PCT/JP2011/004517.
"DLNA Overview and Vision Whitepaper 2007", <URL:http://www.dlna.org/news/DLNA_white_paper.pdf>, 2007, pp. 1-23.
"ContentDirectory:2 Service Template Version 1.01", for UPnP™ Version 1.0. <URL:http//upnp.org/resources/upnpresources.zip→upnpresources/standardizeddcps/MediaServer_2andMediaRenderer_2→UPnP-av-ContentDirectory-v2-Service-20060531.pdf>, May 31, 2006, pp. 1-172.

* cited by examiner

*Primary Examiner* — Rehana Perveen
*Assistant Examiner* — Tiffany Thuy Bui
(74) *Attorney, Agent, or Firm* — Wenderoth, Lind & Ponack, L.L.P.

(57) ABSTRACT

A player (content searching device) compares an acquired piece primary metadata (with running number 100) to a corresponding piece of primary metadata having number 100 in a memory unit. When no matching occurs, primary metadata with running number 99 is used. Then, this acquired primary metadata is compared to the piece of primary metadata having number 100 in the memory unit. When matching occurs, the player acquires content corresponding to running number 99 from a server and begins playback.

11 Claims, 15 Drawing Sheets

FIG.8

| Running Number | Title | Genre | Artist | ... | Content URI | Playlist URI | Special Playback Information | Encoding Information | Nav Information | Resume Information |
|---|---|---|---|---|---|---|---|---|---|---|
| 1 | foo | news | bar | ... | | | | | | |
| ... | ... | ... | ... | ... | ... | ... | ... | ... | ... | ... |
| 99 | ABC | drama | aaa | ... | | | | | | |
| 100 | DEF | sports | bbb | ... | | | | | | |
| 101 | GHI | news | ccc | ... | | | | | | |
| ... | ... | ... | ... | ... | ... | ... | ... | ... | ... | ... |

30: Running Number
Primary metadata 32: 32a Title, 32b Genre, 32c Artist
Secondary metadata 34: 34a Content URI, 34b Playlist URI, 34c Special Playback Information, 34d Encoding Information, 34e Nav Information, 34f Resume Information 56 Metadata memory unit FIG.11
(a)
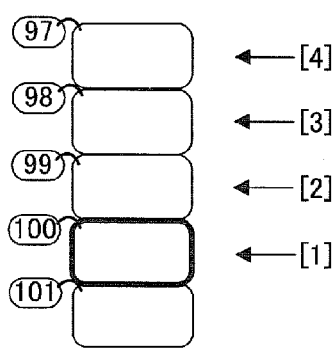
(b)
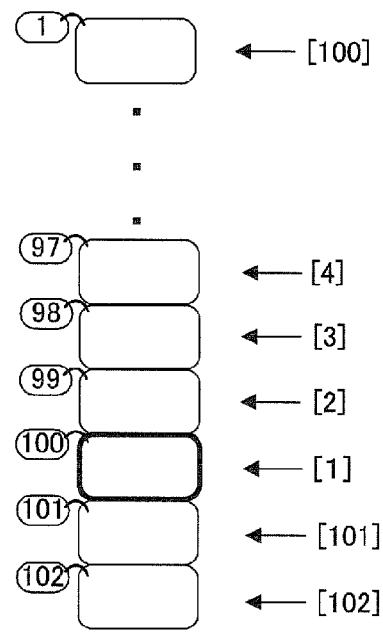
(c)
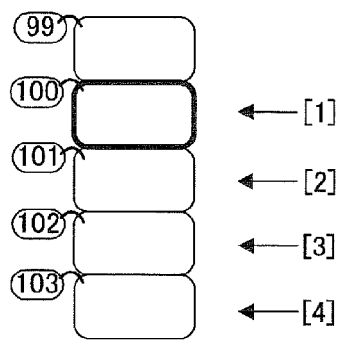
(d)
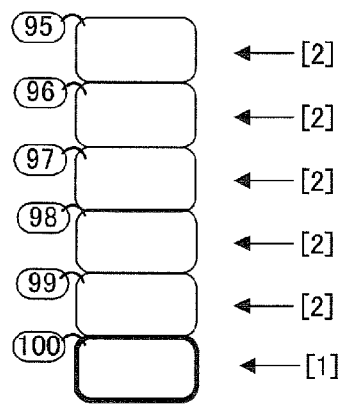
[ ] Primary metadata acquisition order
◯ Running number
▢ Primary item FIG.12
(e)
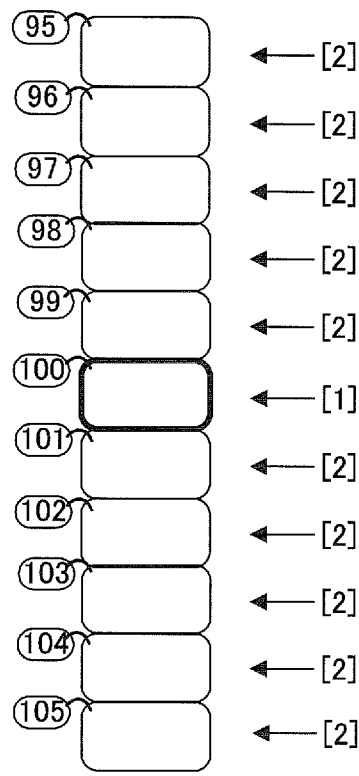
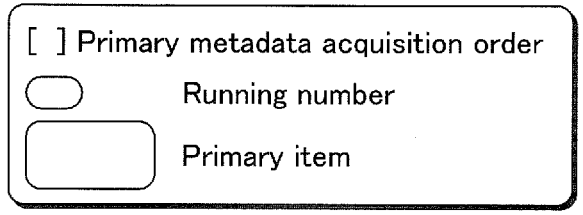

At reception in S41
(stored in memory unit 14)

At comparison in S45

CONTENT SEARCH DEVICE, CONTENT SEARCH METHOD, PROGRAM

BACKGROUND OF INVENTION

1. Technical Field

The present invention pertains to technology for a player (a type of content searching device) connected to a server and searching for desired content managed by the server.

2. Background Art

In recent years, the use of home networks implementing DLNA (Digital Living Network Alliance) guidelines has progressed (Non-Patent Literature 1).

The DLNA guidelines center on device interconnectivity as per UPnP (Universal Plug and Play) (Non-Patent Literature 2). These guidelines enable various devices in a home network environment to share content (overcoming barriers between device manufacturers).

For example, content stored on a server may be played back by a player.

CITATION LIST

Non-Patent Literature

[Non-Patent Literature 1]
"DLNA Overview and Vision Whitepaper 2007", [online], retrieved Aug. 10, 2012, URL: http://www.dlna.org/news/DLNA_white_paper.pdf

[Non-Patent Literature 2]
ContentDirectory: 2 Service Template Version 1.01 For UPnP™ Version 1.0, [online], retrieved Aug. 10, 2010, URL: http://upnp.org/resources/upnpresources.zip, file UPnP-av-ContentDirectory-v2-Service-20060531.pdf in folder upnpresources/standardizeddcps/MediaServer_2 and MediaRenderer_2

SUMMARY OF INVENTION

The relevant DLNA guidelines are structured around a server managing large amounts of content by assigning running numbers thereto.

Information pertaining to these running numbers is communicated to the player by the server. Said running numbers are then used when the player designates content to the server for playback.

As it happens, the running number information is not typically synchronized between the server and the player in real time. Thus, an attempt by the player to acquire content may fail when the server has been updated but updated server information has not yet reached the player.

This problem is not limited to DLNA-dependent environments. Similar problems arise in any network environment where a server manages content using non-permanent running numbers and a content searching device connected to the server searches the content.

In consideration of the above, the present invention aims to assist in content acquisition by a content searching device searching content on a server managing the content by assigning running numbers thereto.

A content searching device using a given running number to search for a piece of content on a server having a first database in which pieces of the content are associated with running numbers and with primary metadata describing the corresponding pieces of the content, the content searching device comprising: a memory unit storing a second database corresponding to the first database; a synchronization unit receiving information from the server when a synchronization condition is met and synchronizing the second database with the first database according to the information so received, the information pertaining to the running numbers and to the primary metadata in the first database; a reception unit receiving a designation of the given running number from a user, the designation being made from the running numbers in the second database; a metadata acquisition unit using the given running number so designated to acquire a corresponding piece of the primary metadata from the server; and a determination unit making, for every acquisition, a comparison between (i) the piece of the primary metadata and (ii) a piece of the primary metadata corresponding to the given running number in the second database, so as to determine matching, wherein when the determination unit determines no matching, the metadata acquisition unit uses another running number proximal to the given running number to further acquire another piece of the primary metadata from the server, and the content searching device further comprises: a content acquisition unit acquiring a piece of the content corresponding to the other running number from the server when the determination unit determines matching in the comparison made using the piece of the primary metadata corresponding to the other running number; and a playback unit playing back the piece of the content acquired by the content acquisition unit.

The server uses the running numbers to manage the primary metadata. When content deletion (primary metadata deletion) occurs, the running numbers of all content following the deleted piece of content are shifted up. Conversely, when content addition (primary metadata addition) occurs, the running numbers of all content following the added piece of content are shifted down.

Therefore, according to the content searching device pertaining to the present invention, the metadata acquisition unit is capable of acquiring primary metadata using proximal running numbers, thereby enabling matching of primary metadata for content for which matching is initially attempted. As such, the present invention provides assistance in the acquisition of the designated content.

BRIEF DESCRIPTION OF DRAWINGS

FIG. 8 shows an example of data stored in a metadata memory unit 56.

FIGS. 11A through 11D illustrate decision methods A through D for use in second and subsequent running number acquisitions.

FIG. 12 illustrates decision method E for use in second and subsequent running number acquisitions.

DETAILED DESCRIPTION OF INVENTION

Embodiments of the present invention are described below, with reference to the accompanying drawings.

Figure 1:
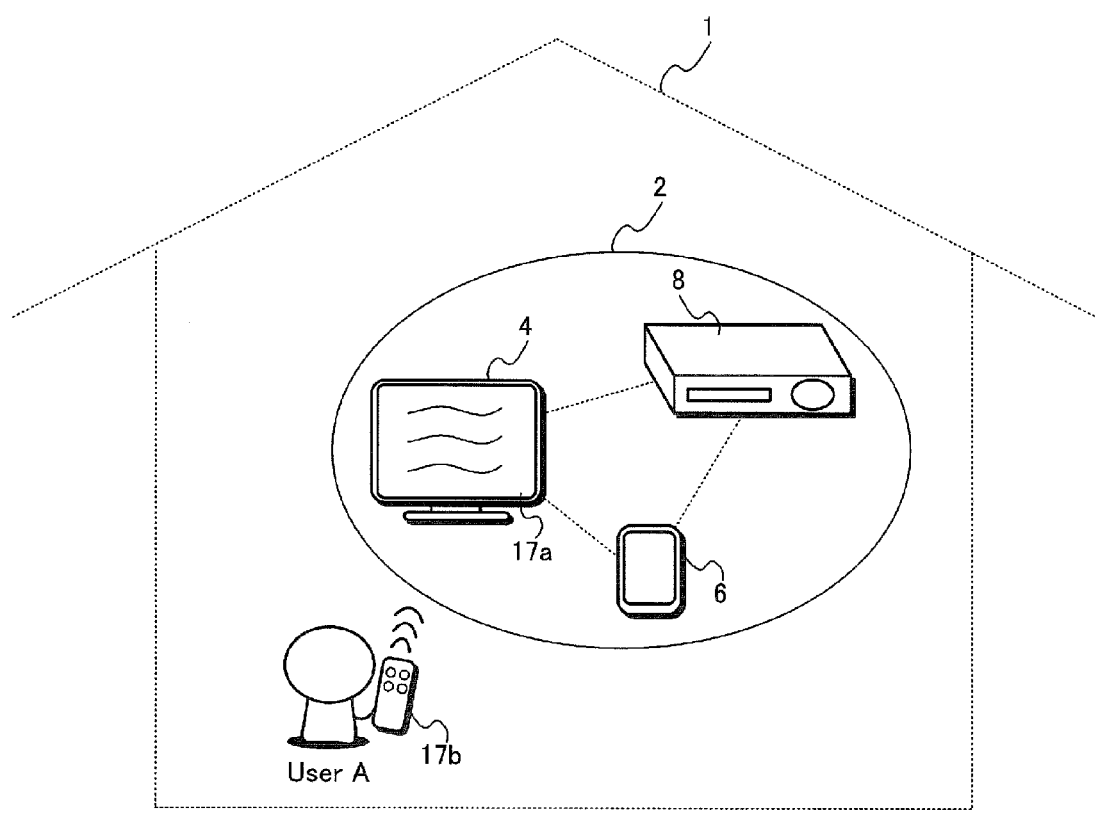
FIG. 1 illustrates a user A with a home network 2 in a home 1.

FIG. 1 illustrates a user A in a home 1 with a home network 2 formed by participating player 4, player 6, and server 8.

Players 4 and 6 are DMPs (Digital Media Players) conforming to DLNA guidelines.

The server 8 is a DMS (Digital Media Server) conforming to the same DLNA guidelines.

As an example of implementation, player 4 is a digital television, player 6 is a mobile terminal, and the server 8 is a Blu-Ray disc recorder.

The devices 4, 6, and 8 operate according to DLNA (and UPnP) guidelines, as DLNA-compatible devices typically do.

That is, devices are discovered and device functions are understood through the use of SSDP (Simple Service Discovery Protocol), content metadata are exchanged through the use of SOAP, and content transfer is performed through the use of HTTP (Hypertext Transfer Protocol). Unless otherwise noted, the content discussed herein is in video format.

The home network 2 normally has player 4 play back a piece of content from the large volume of content stored on the server 8 as per the following steps 1 through 7.

(1) Player 4 acquires a list of content stored on the server 8.
(2) Player 4 displays the acquired list on a display 17a for the user A to browse.
(3) Player 4 receives a designation of a running number for content designated by the user from the list.
(4) Player 4 uses the running number so designated to acquire primary metadata (metadata describing the content) corresponding to the running number from the server 8.
(5) Player 4 compares the primary metadata so acquired to locally-stored primary metadata corresponding to the same running number in order to determine matching.
(6) Upon match determination, player 4 requests acquisition of a URI (Uniform Resource Identifier) for the content corresponding to the running number from the server 8.
(7) Player 4 acquires content from the resource indicated by the acquired URI for playback on the display 17a.

Matching should be found in the aforementioned step 5 provided that the running number information stored by player 4 and the running number information stored on the server 8 are synchronized in real-time.

Ordinarily, player 4 only acquires the running number information from the server when a synchronization condition is met (e.g., when the player 4 power supply is initialized). Therefore, time must pass before content added or deleted by the server 8 is reflected in an update to player 4 (due to update lateness, the running number information stored in player 4 may be old, compared to that currently stored on server 8 as described above). Such a situation leads to non-matches being determined in step 5.

In the present Embodiment, acquisition of the content received by player 4 is realized, even when such a situation arises.

Figure 2:
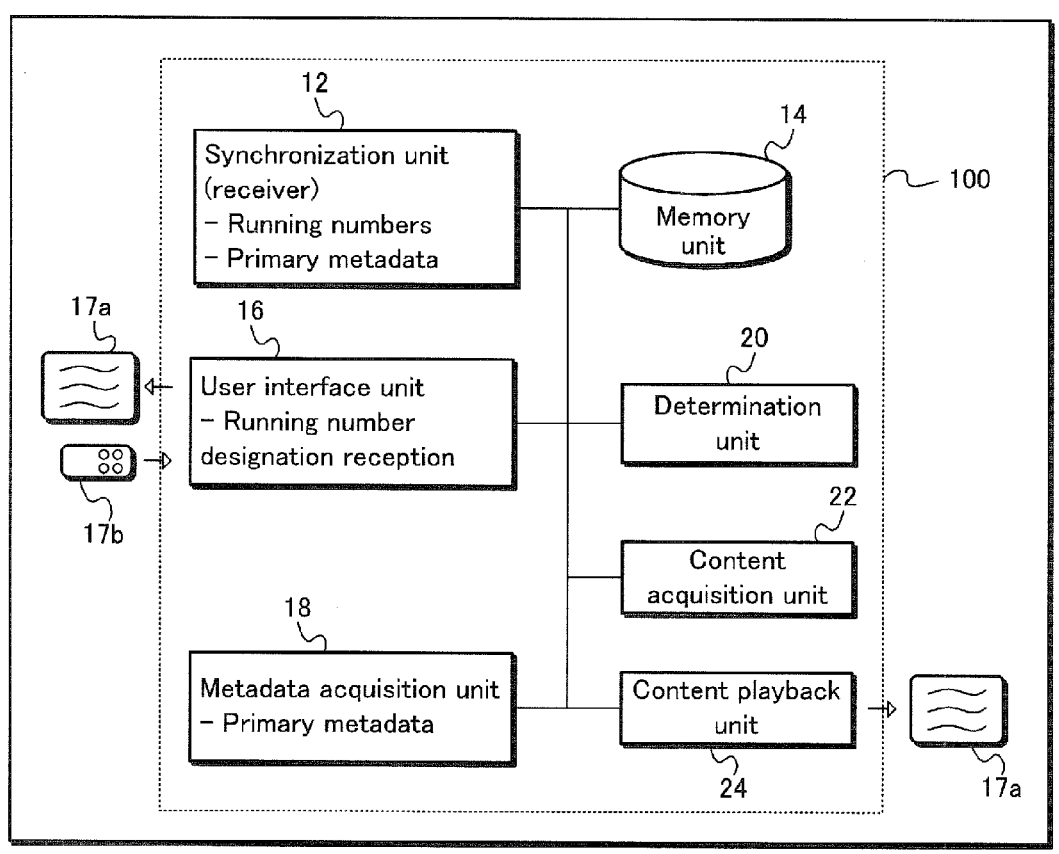
FIG. 2 is a functional block diagram of a player 4.

FIG. 2 is a functional block diagram of player 4.

Player 4 includes a synchronization unit 12, a memory unit 14, a user interface unit 16, a metadata acquisition unit 18, a determination unit 20, a content acquisition unit 22, and a content playback unit 24.

The synchronization unit 12 receives running numbers and primary metadata from the server 8 in response to a browse request issued thereto, and stores the running numbers and primary metadata so received in the memory unit 14 (which is flash memory, for example).

When running numbers and primary metadata are already stored in the memory unit 14, the synchronization unit 12 performs a synchronization process of updating the information stored in the memory unit 14 using the received running numbers and primary metadata.

Figure 3:
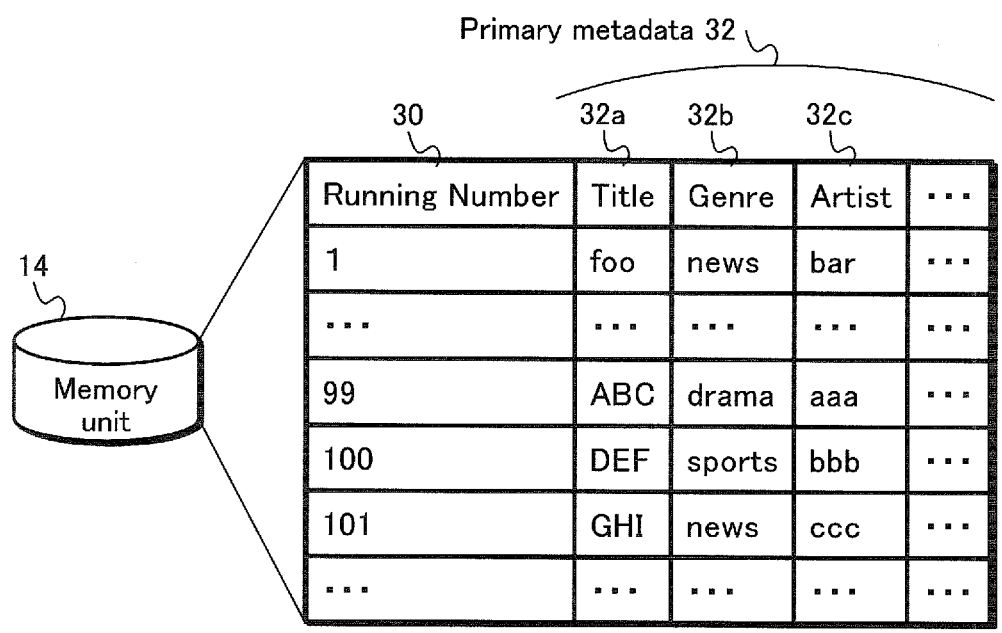
FIG. 3 shows an example of data stored in a memory unit 14.

FIG. 3 shows an example of the data stored in the memory unit 14.

In the example shown, the memory unit 14 stores running numbers 30 and primary metadata 32 for each running number.

The primary metadata 32 describes the content, and each piece includes such items as a title 32a, a genre 32b, and an artist 32c.

The description of the functional blocks resumes, with reference to FIG. 2.

The user interface unit 16 controls the user interface, displays a content list on the display 17a based on the primary metadata received by the synchronization unit 12, and receives a content designation from the displayed content list made through a remote control 17b. The content designation is made by receiving a running number designation, as described later.

The metadata acquisition unit 18 issues a browse request to the server 8 in order to acquire the primary metadata corresponding to the running number designated to the user interface unit 16 (or to a previous or subsequent running number).

As described below, the metadata managed by the server 8 is made up of many items. The metadata acquisition unit 18 acquires only three of these items, namely the title, genre, and artist. Acquisition is realized by including information requesting the title, genre, and artist in the above-described browse request.

The determination unit 20 determines matching between the primary metadata acquired by the metadata acquisition unit 18 and the primary metadata corresponding to the running number in the memory unit 14.

The content acquisition unit 22 acquires content corresponding to the running number from the server 8 when the determination unit 20 determines matching. Specifically, the content acquisition unit 22 makes a request to the server 8 for the acquisition of the URI corresponding to the running number, then acquires the content from the resource indicated by the URI.

The content playback unit 24 plays back the content received by the content acquisition unit 22 on the display 17a.

Next, the operations performed by player 4 playing back content stored on the server 8 are described with reference to the flowchart of FIG. 4.

First, the synchronization unit 12 issues a browse request to the server 8, receives running numbers and primary metadata therefrom, and performs a synchronization process of updating the memory unit 14 using the received running numbers and primary metadata (S41).

Next, the user interface unit 16 displays a content list based on the primary metadata received by the synchronization unit 12 on the display 17a (S42).

The user interface unit 16 then receives a running number designation made via the remote control 17b from the displayed list (S43).

Steps S42 and S43 are performed using ordinary methods. For example, a list composed of titles, genres, and artists (see FIG. 3) is displayed, a designation of an item from the displayed list is received, and the running number for the received item by reference to the memory unit 14 is specified. The user need not be provided with the running numbers, as long as there is some way for player 4 to specify the relevant running number.

Next, the metadata acquisition unit 18 acquires the primary metadata corresponding to the designated running number by issuing a browse request to the server 8 (S44).

Then, the determination unit 20 compares the primary metadata acquired in step S44 and the primary metadata in the memory unit 14 having the running number designated in step S43 (S45).

When there is matching (Yes in S46), the content acquisition unit 22 acquires the content corresponding to the running number and the content playback unit 24 plays back the content so acquired (S48).

When there is no matching (No in S46), the metadata acquisition unit 18 acquires the primary metadata having a running number preceding or following the acquired running number (S47).

The determination unit 20 repeats the comparison and determination of steps S45 and S46 using the newly-acquired primary metadata.

As described in the flowchart of FIG. 4, when the metadata acquisition unit 18 cannot acquire the content that the user wishes to play back on a first attempt (S44), the content is instead acquired on a second or later subsequent attempt (S47). Content acquisition is thus assisted.

Specific examples are described below, with reference to FIGS. 5 and 6.

Figure 5:
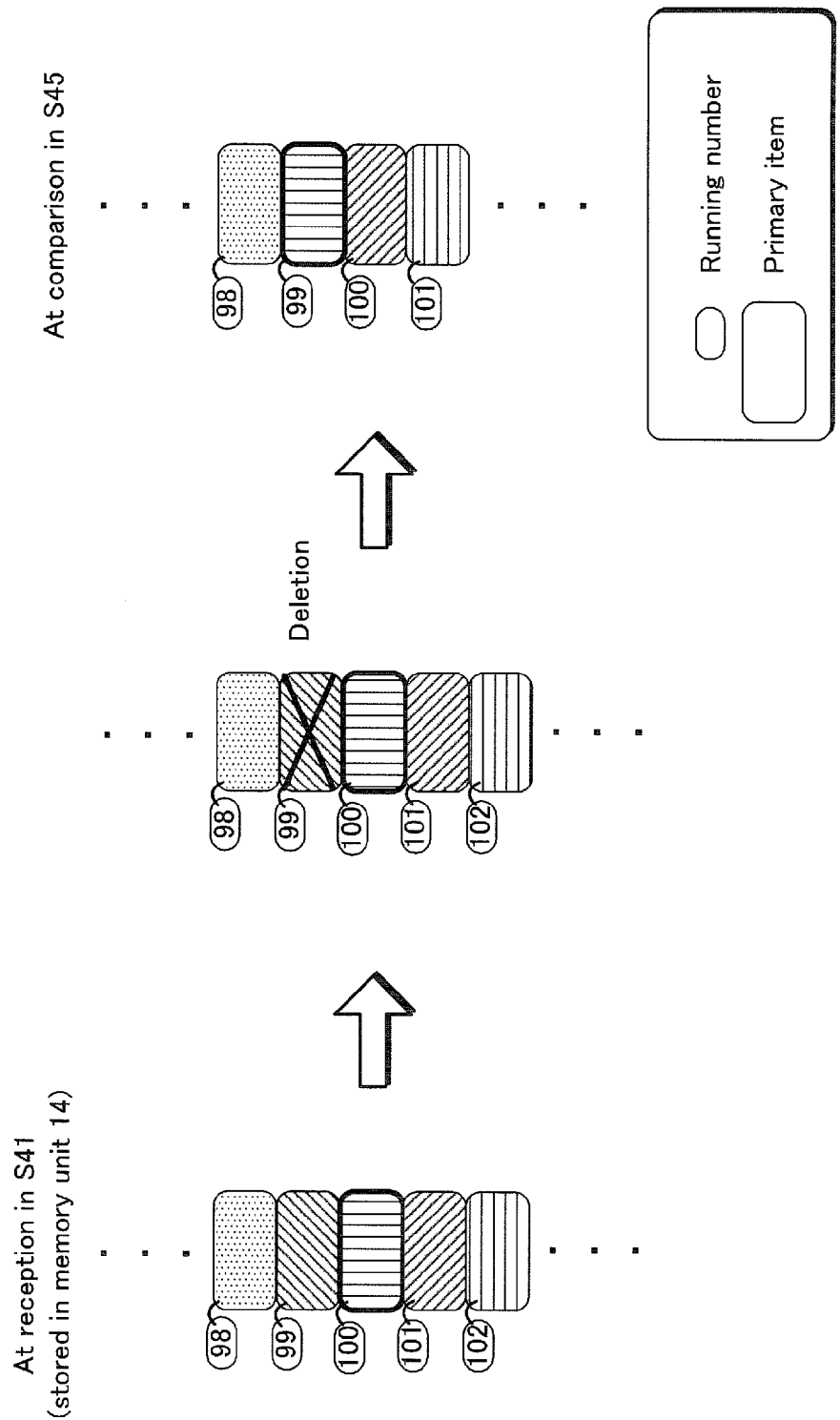
FIG. 5 illustrates deletion of one piece of primary metadata (content deletion) causing the running numbers of all subsequent primary metadata to be shifted higher.

FIG. 5 is a diagram illustrating a situation where the primary metadata corresponding to a running number is shifted higher due to the deletion of other primary metadata (i.e., content deletion).

As shown, when the content having running number 99 is deleted from the server 8 at some point between reception and storage in memory unit 14 in step S41 and the comparison in step S45, the primary metadata of the deleted content is also deleted, causing the primary metadata originally numbered 100 and lower to be renumbered and thus shifted up by one.

This shift is not reflected in the memory unit 14 of player 4 when step S45 is performed. Thus, a discrepancy emerges between the running number information stored in the memory unit 14 of player 4 and the running number information being managed by the server 8.

For example, in player 4, the content having running number 100 has title DEF (see FIG. 3), while in the server 8, the content having running number 100 is the content having title GHI, which previously had running number 101.

Figure 6:
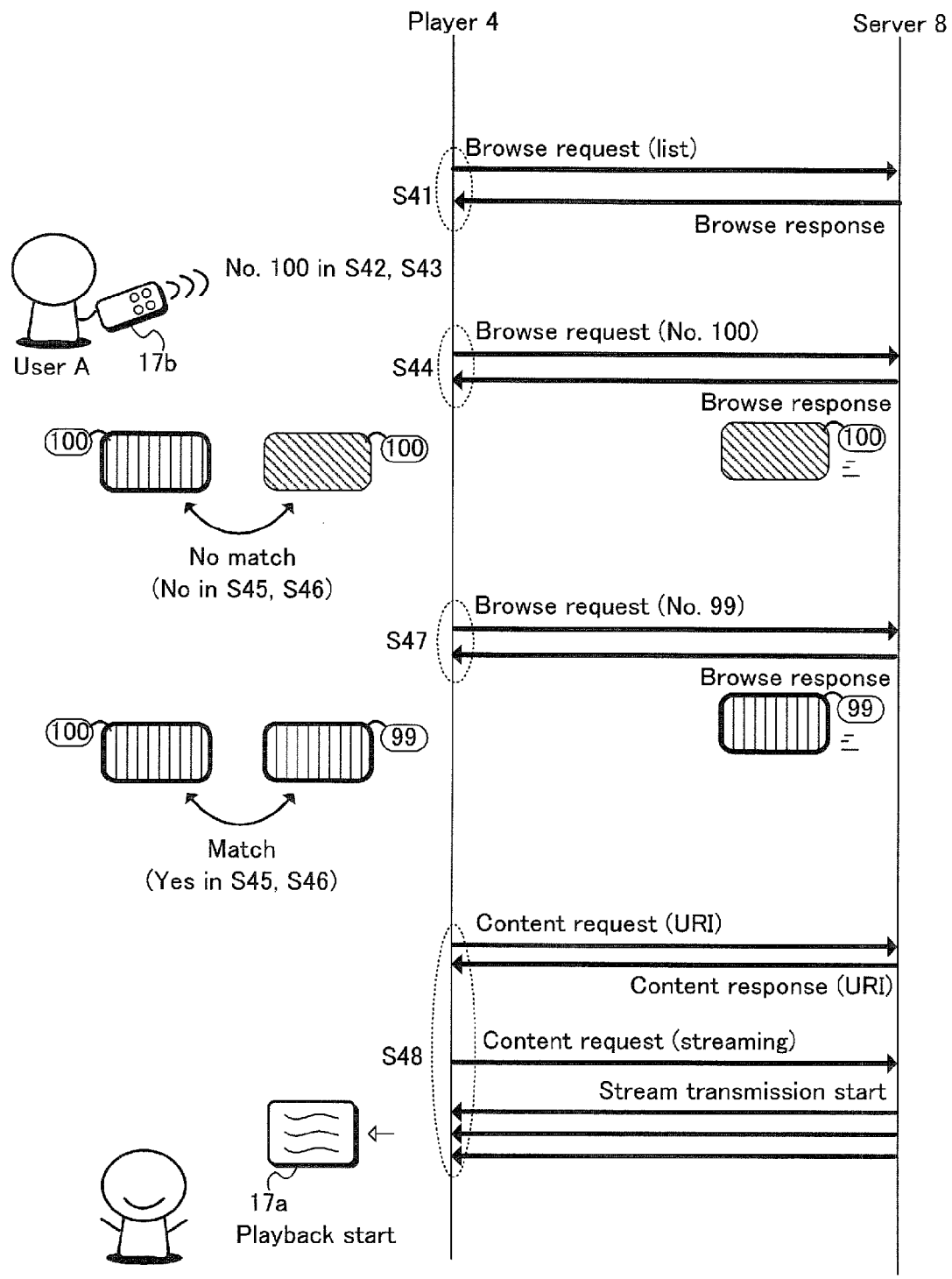
FIG. 6 is a sequence diagram of the player 4 and the server 8.

FIG. 6 is a sequential diagram illustrating a situation where player 4 receives a designation of the content having running number 100 in conditions where such a discrepancy has occurred.

Figure 4:
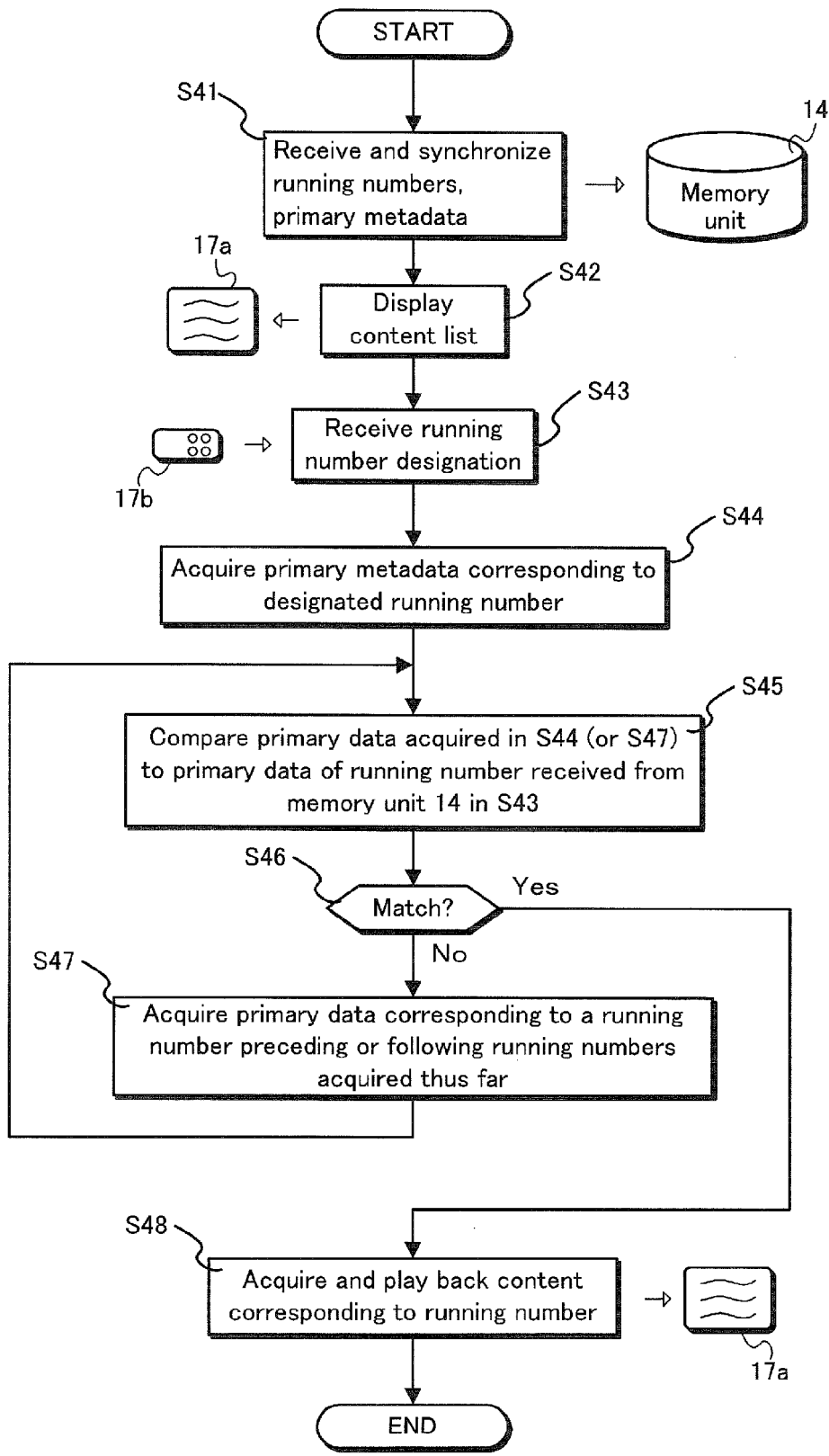
FIG. 4 is a flowchart indicating the operations performed by the player 4 playing back content stored on a server 8.

For simplicity, the step numbers of FIG. 6 correspond to those of FIG. 4, and explanations are omitted from duplicated steps.

First, the synchronization unit 12 of player 4 receives the running numbers and the primary metadata from the server 8 (S41), displays a list based on the running numbers and primary metadata so received (S42), and receives a designation of the content with running number 100 and having the title DEF from the displayed list (S43, No. 100).

Next, the metadata acquisition unit 18 acquires the primary metadata corresponding to running number 100 by issuing a browse request (No. 100) to the server 8 (S44).

The determination unit 20 compares the primary metadata so acquired to the primary metadata corresponding to running number 100 as stored in the memory unit 14 (S45). This involves comparing each item of primary metadata and ultimately determining matching only when all items are identical.

As described above, the content having running number 100 on the server 8 is the content that previously had running number 101 and that has primary metadata including title GHI. Thus, the comparison proceeds as follows.

Acquired primary metadata having running number 100
Title: DEF; Genre: sports; Artist: bbb
Primary metadata stored in the memory unit 14 having running number 100
Title: ABC; Genre: drama; Artist: aaa
Given that the title, genre, and artist all differ, the determination unit 20 determines a non-match (No in S46).

Next, the metadata acquisition unit 18 acquires the primary metadata corresponding to running number 99, which precedes previously-acquired running number 100 by one (S47, No. 99).

The determination unit 20 compares the primary metadata so acquired to the primary metadata corresponding to running number 100 as stored in the memory unit 14. The primary metadata having running number 99 on the server 8 is the primary metadata that previously had running number 100. Thus, the comparison proceeds as follows.

Acquired primary metadata having running number 99
Title: ABC; Genre: drama; Artist: aaa
Primary metadata stored in the memory unit 14 having running number 100
Title: ABC; Genre: drama; Artist: aaa
Given that the title, genre, and artist are all identical, the determination unit 20 determines matching (Yes in S46).

Next, the content acquisition unit 22 acquires the URI of the content corresponding to running number 99 by issuing a content request (URI) to the server 8. The URI is, for example, http://example.com/contents99.mp4 and may include information indicating running number 99.

Once the URI is acquired, the content playback unit 24 performs a content request (streaming) using the acquired URI, and then begins playback using the received streaming content (S48).

As explained above, in the example of FIG. 6, the user-desired content is acquired irrespective of any discrepancies between the running number information of player 4 and that on the server 8.

The occurrence of such discrepancies can be reduced by adjusting the synchronization condition for the synchronization unit 12 or similar so as to increase the frequency of running number information synchronization between player 4 and the server 8. Of course, the greater the amount of content managed by the server 8 in particular, the greater the processing load required for synchronization, which imposes a practical limit. The present Embodiment also offers reduction of the processing load required for synchronization.

Further, the present Embodiment makes possible information sharing between player 4 and the server 9 that conforms to DLNA guidelines, and does so specifically through support for content acquisition by player 4 without making changes to the server 8.

Embodiment 2

In Embodiment 2, savings in memory consumption are achieved for the player by paring down the metadata stored thereby.

The recent rapid increase in server memory capacity has led to a tendency to have servers manage large amounts of content.

Although individual pieces of content metadata are not large (e.g., on the order of one kilobyte), given tens of thousands of pieces of content, the total capacity required to store the corresponding tens of thousands of pieces of metadata is not negligible (e.g., on the order of tens of megabytes).

As such, the metadata managed by the sever presses against the limits of player memory when stored therein as-is.

Thus, Embodiment 2 aims to achieve savings in memory consumption for the player by paring down the metadata stored thereby.

Figure 7:
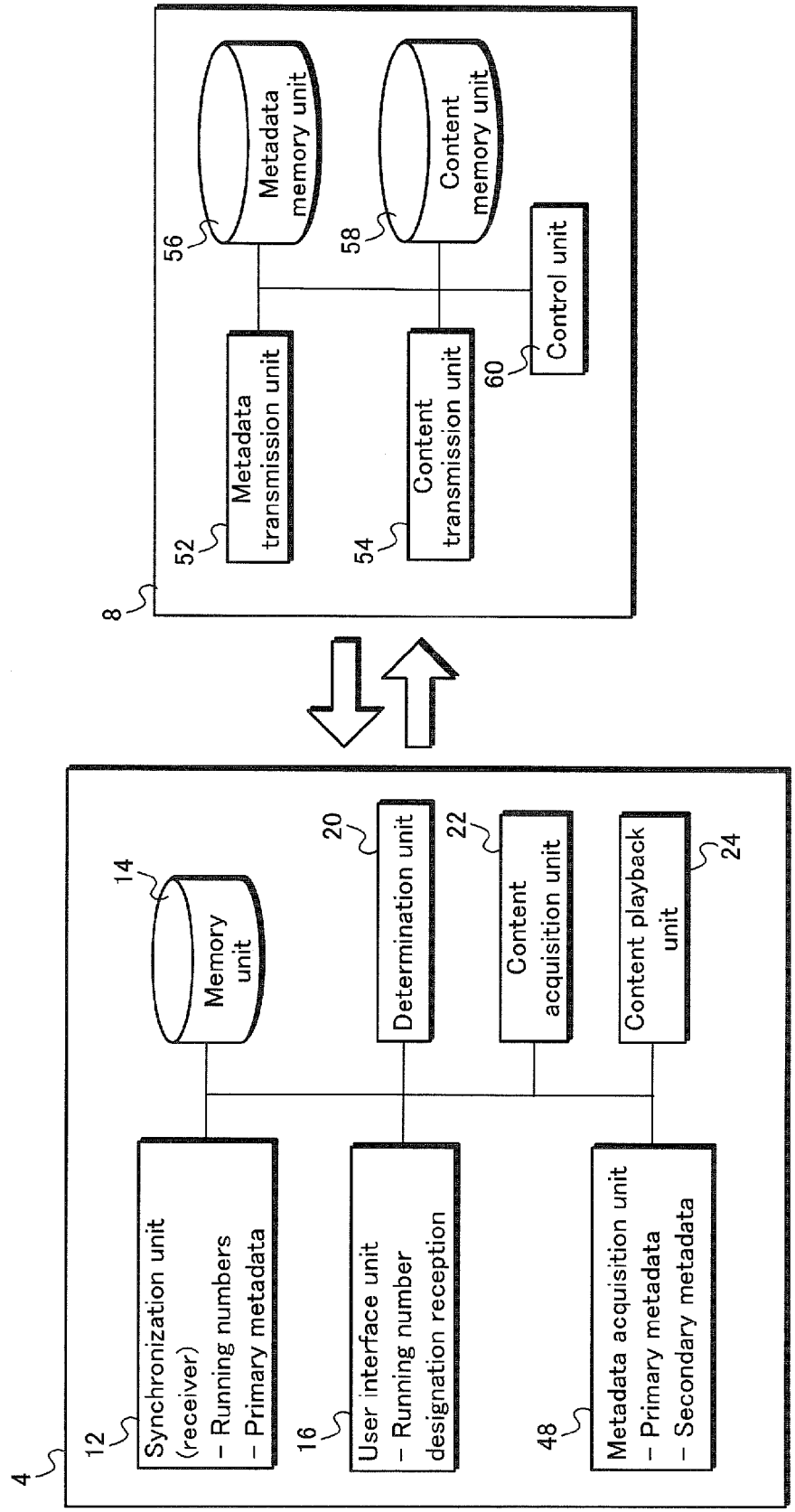
FIG. 7 is a functional block diagram of the player 4 and the server 8.

FIG. 7 is a functional block diagram of player 4 and the server 8 pertaining to Embodiment 2. FIG. 7 uses the same reference numbers as FIG. 2.

In addition to the primary metadata, a metadata acquisition unit 48 of player 4 acquires secondary metadata indicating the playback format for the content from the server 8. The details of the secondary metadata are described below.

The content playback unit 24 performs playback using the playback format indicated by the secondary metadata.

The server 8 includes a metadata transmission unit 52, a content transmission unit 54, a metadata memory unit 56, a content memory unit 58, and a control unit 60.

The metadata transmission unit 52 transmits the primary metadata and the secondary metadata stored in the metadata memory unit 56 in response to a request from the synchronization unit 12 or the metadata acquisition unit 48 of player 4.

The content transmission unit 54 transmits the content and content URI stored in the content memory unit 58 in response to the request from the content acquisition unit 22 or the content playback unit 24 of player 4.

The control unit 60 manages and controls the other components.

FIG. 8 shows an example of the data stored in the metadata memory unit 56.

In the example of FIG. 8, the metadata memory unit 56 stores running numbers 30 as well as primary metadata 32 and secondary metadata 34 corresponding to each running number.

The primary metadata 32 describes the content, each piece including three items, namely a title 32a, a genre 32b, and an artist 32c.

The secondary metadata 34 indicates the playback format for a piece of content and includes six items, namely a content URI 34a identifying the resource, a playlist URI 34b serving as a content playlist, special playback information 34c indicating any limitations on special playback modes such as rewind and fast-forward, encoding information 34d indicating the codec, bitrate, and so on, nav information 34e pertaining to content playback navigation, and resuming information 34f pertaining to a resume function allowing playback to be resumed at a previous stop position.

Figure 9:
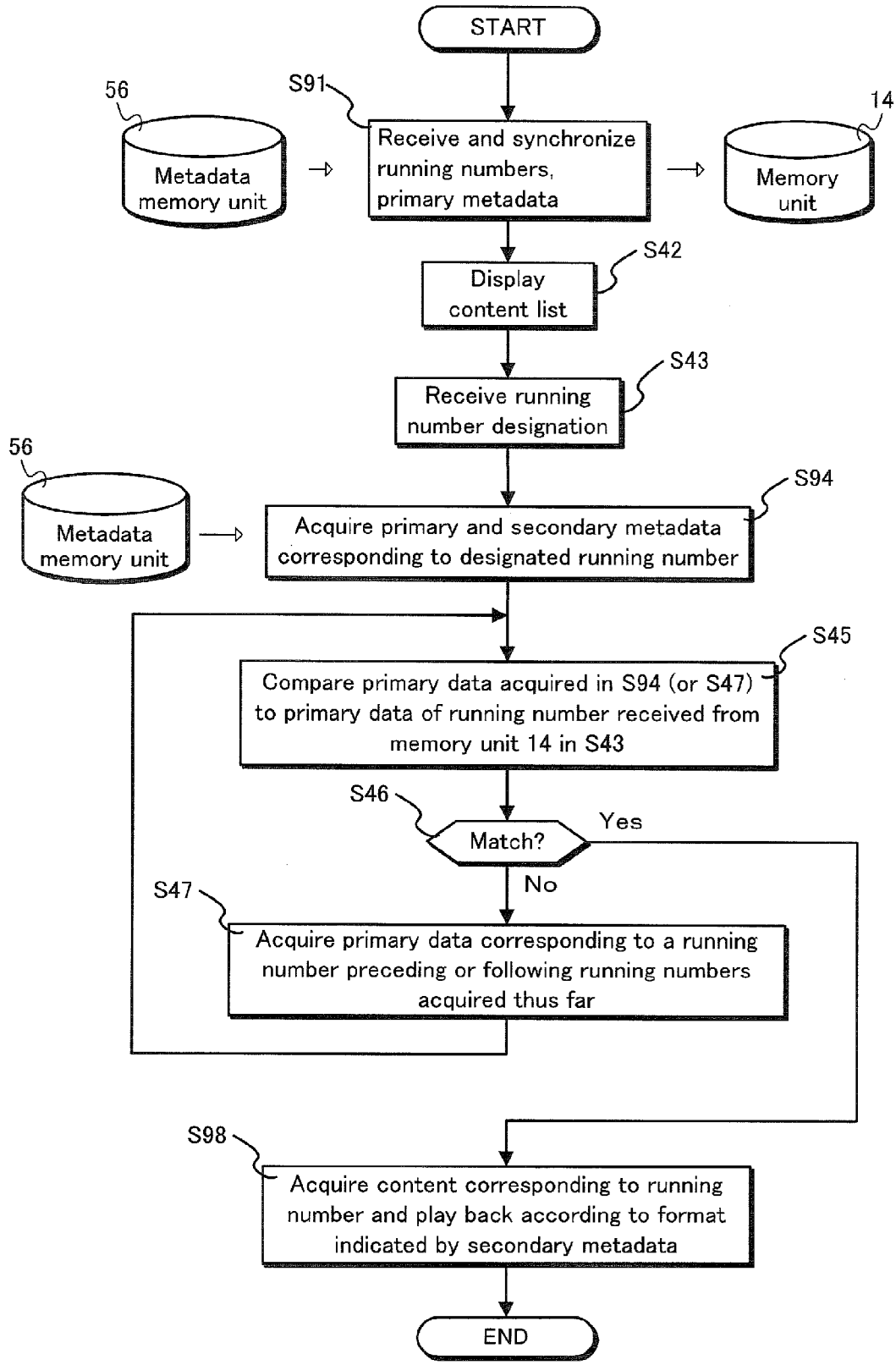
FIG. 9 is a flowchart indicating the operations performed by the player 4 when playing back content stored on a server 8.

Next, the operations performed by player 4 playing back content stored on the server 8 are described with reference to the flowchart of FIG. 9. In FIG. 9, steps identical to those of FIG. 4 use the same reference numbers thereas, and explanations are omitted below.

First, the metadata acquisition unit 48 of player 4 issues a browse request in order to receive the running numbers and the primary metadata from the metadata memory unit 56 of the server 8, then performs a synchronization process updating the data stored in the memory unit according to the running numbers and the primary metadata so received (S91).

Then, once the user interface unit 16 received a running number designation (S43), the metadata acquisition unit 48 acquires the primary metadata and the secondary metadata corresponding to the designated running number from the metadata memory unit 56 of the server 8 by issuing a browse request.

After the primary metadata comparison (S45), when matching is determined (Yes in S46), the content acquisition unit 22 acquires content corresponding to the running number. The content playback unit 24 then plays back the content in accordance with the playback format indicated by the secondary metadata corresponding to the running number (S98).

According to the present Embodiment, and as steps S91 and S94 suggest, synchronization is applied to the primary metadata received by the synchronization unit 12 but not to the secondary metadata, thereby requiring less space in memory unit 14.

When, for example, the server 8 manages tens of thousands of pieces of audio content, the total amount of metadata stored in the metadata memory unit 56 (see FIG. 8) may be as much as 75 MB. By not synchronizing the secondary metadata, the size of the metadata stored in the memory unit 14 is reduced to as little as 25 MB.

Of course, the purpose is to guarantee a certain amount of free space on the memory unit 14. Thus, step 91 may also be carried out by having the synchronization unit 12 receive all metadata, including the secondary metadata, and later filter out the secondary metadata for exclusive storage in the memory unit 14.

Said filtering may be achieved using general methods, including a whitelist approach or a blacklist approach.

(Supplement 1)

Although the Embodiments have been described above, the present invention is not limited thereto. Other Embodiments and variations achieving the aim of the present invention and aims related thereto are also possible, such as the following.

(1) Decision Method for Running Number of Second and Subsequent Acquisition

The example shown in FIG. 6 for Embodiment 1 is described as involving primary metadata corresponding to a running number that has been shifted up by one on the server 8. However, the opposite situation may also occur, where content is added on the server 8 and the primary metadata are each renumbered, and thus shifted down.

Figure 10:
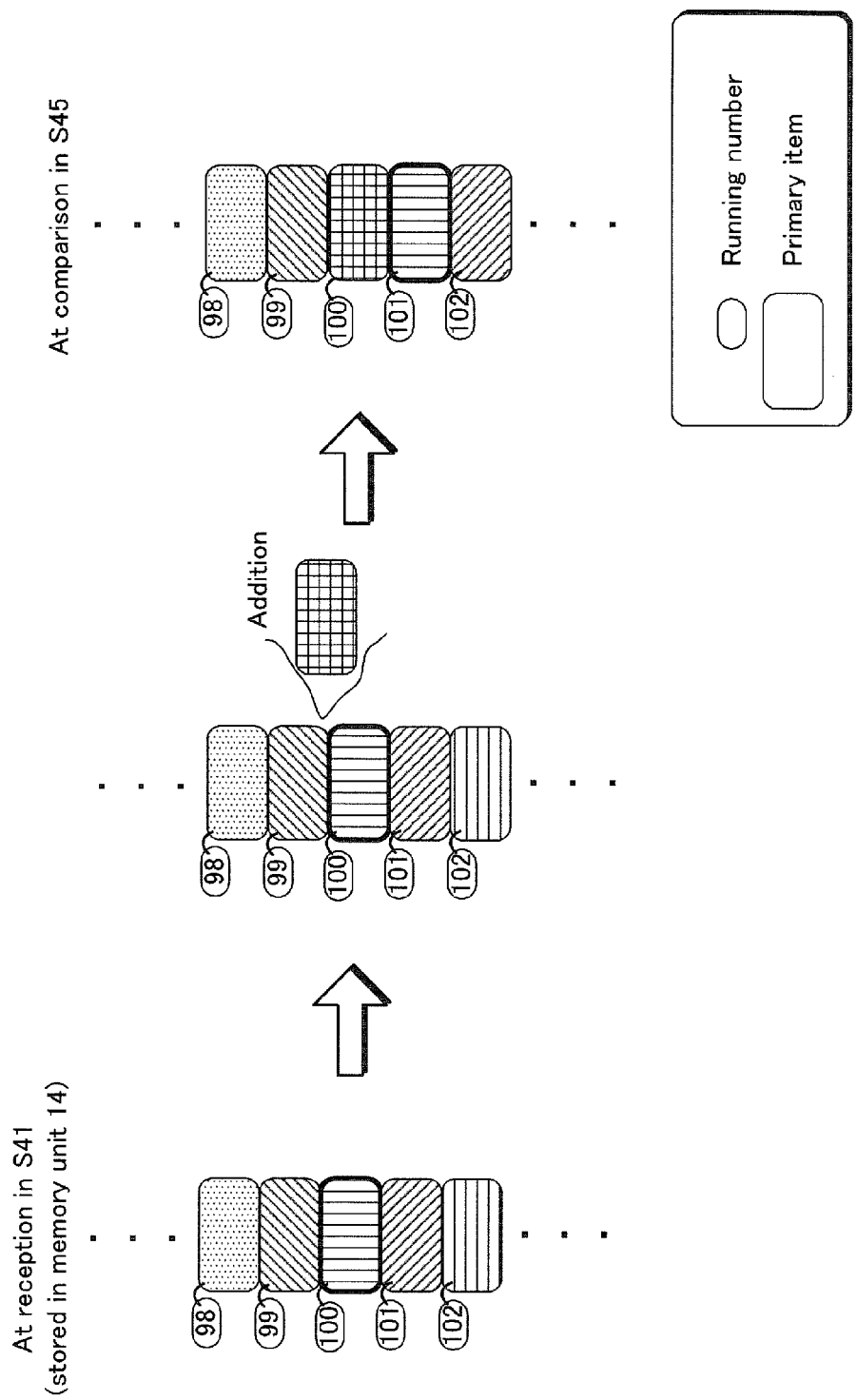
FIG. 10 illustrates addition of one piece of primary metadata (content addition) causing the running numbers of all subsequent primary metadata to be shifted lower.

That is, as shown in FIG. 10, when a new piece of primary metadata is added between the primary metadata having running numbers 99 and 100 on the server 8, the addition causes all primary metadata numbered 100 and lower to be shifted down by one.

As such, several decision methods are possibly applicable to the acquisition of second and subsequent running numbers according to the various ways in which the running numbers may be shifted, as illustrated by FIGS. 5 and 10.

Examples of such decision methods for cases where running number 100 is designated are described below, with reference to FIGS. 11A through 11D.

(a) The primary metadata are acquired by repeatedly using the next successive running number beginning with the designated No. 100, in the ascending order 100→99→98→97, similar to the example shown in FIG. 6 for Embodiment 1 (FIG. 11A).

(b) As in (a), the primary metadata are acquired by repeatedly using the next successive running number beginning with No. 100, in the ascending order 100→99→98→97. After reaching the top running number 1, acquisition continues by repeatedly using the next successive running number in the descending order 101→102→103 (FIG. 11B).

(c) In a reversal of (a), the primary metadata are acquired by repeatedly using the next successive running number beginning with the designated No. 100, in the descending order 100→101→102→103 (FIG. 11C).

(d) The second and subsequent acquisitions are performed using a successive running number method similar to (a), but taking groups of five running numbers at a time to acquire bundles of metadata in the order 100→95→99→90-94 (FIG. 11D). No limitation to groups of five is intended. Groups of 10 or of some other arbitrary number are also possible.

(e) Five pieces of metadata preceding and following the running number are acquired for the second and subsequent acquisitions, in the order 100→95-99 and 101-105→90-94 and 106-110 (FIG. 12E).

(2) Abort Conditions for Primary Metadata Acquisition Repetitions

Although the flowchart of FIG. 4 indicates that steps S45 through S47 (see FIG. 4) are repeated until matching is determined (Yes in step S46), acquisition may also be aborted without match determination. This may be done because of the user wait time required for extensive repetitions when the server 8 is managing a large quantity of running numbers. Also, the farther a given running number is from the designated running number, the lower the probability of a primary metadata match.

For example, acquisition may be aborted when a fixed number of pieces of metadata (e.g., 100) have been acquired in steps S45 through S47, or when a certain time (e.g., five seconds) has elapsed since the process of steps S45 through S47 began.

Figure 13:
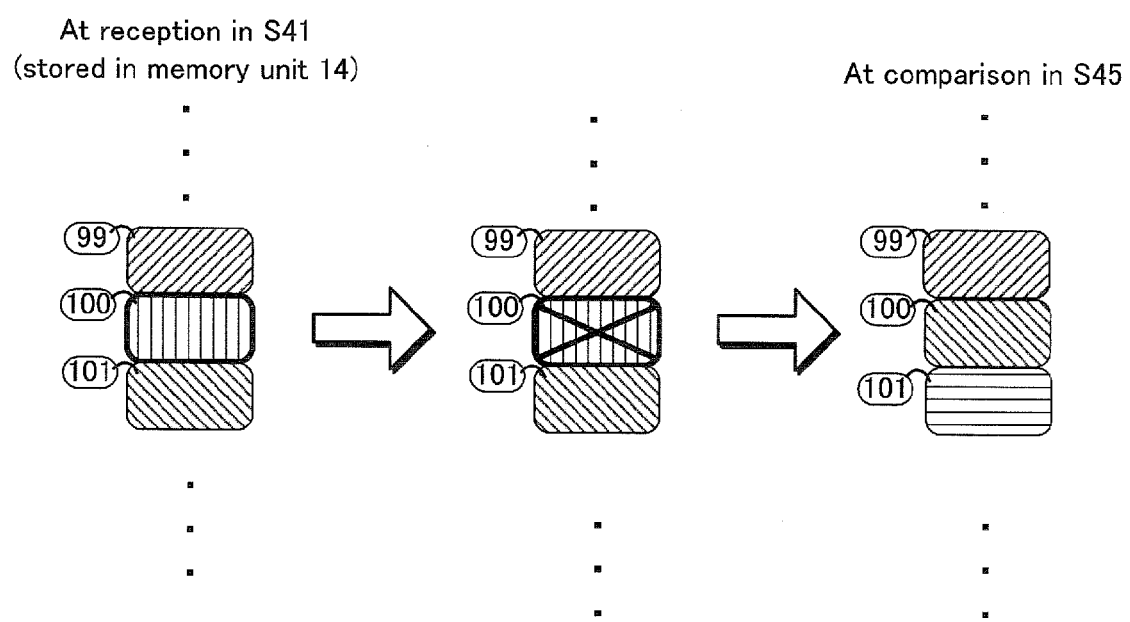
FIG. 13 illustrates a situation where the user wishes to view content having running number 100 but the corresponding primary metadata has been deleted.

Also, as shown in FIG. 13, a situation may arise where the content having running number 100 is deleted from the server 8 in the time between storage in the memory unit 14 upon receipt in step S41 and comparison in step S45, thus leading to deletion of the primary metadata for said content.

Figure 14:
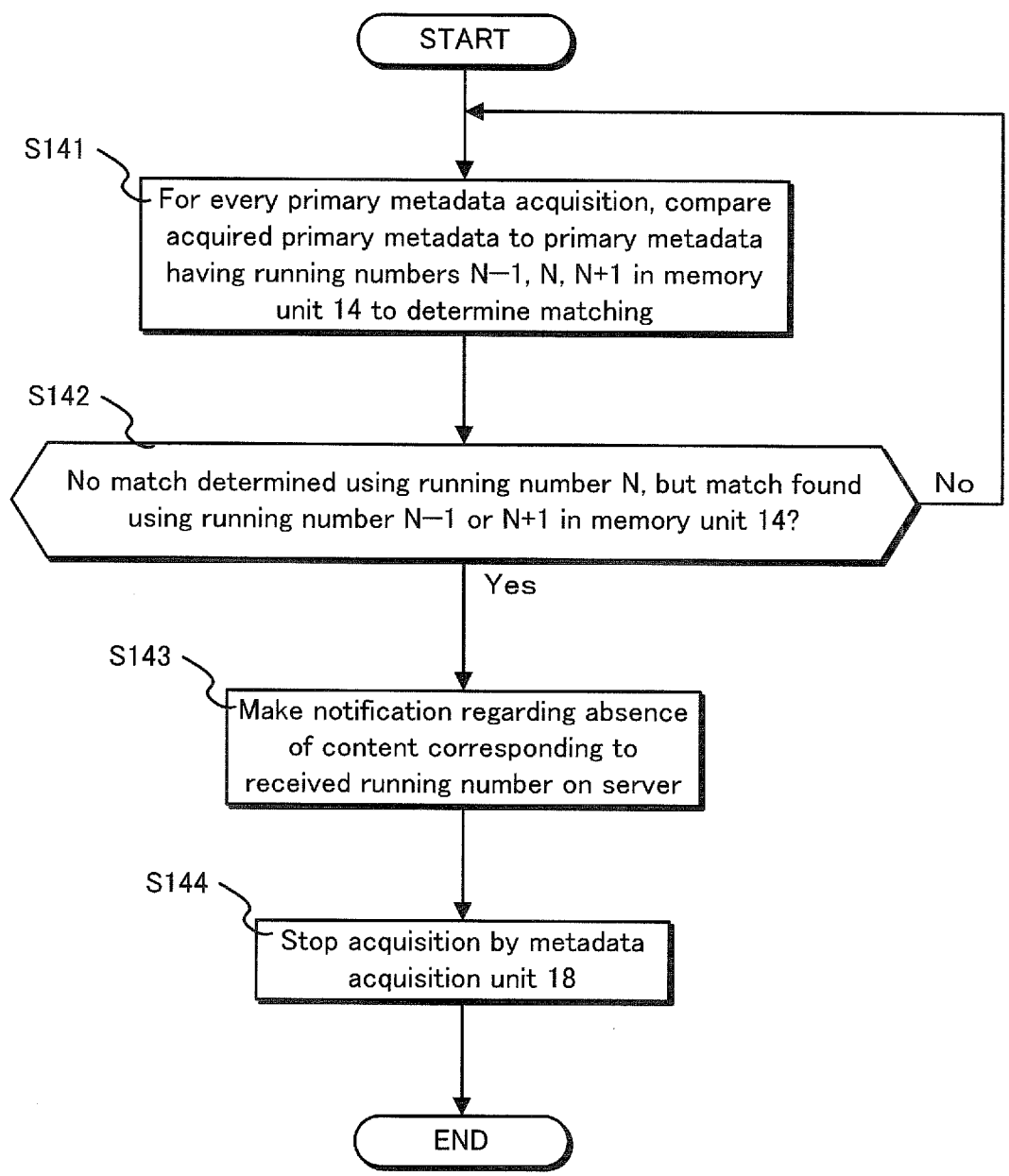
FIG. 14 is a flowchart indicating the operations of the player 4 pertaining to notification.

In such a situation, the determination unit 20 may perform a process such as that indicated in FIG. 14, in tandem with the flowchart of FIG. 4.

That is, when acquiring the primary metadata, the determination unit 20 compares the acquired primary metadata to the primary metadata having numbers N−1, N, and N+1 in the memory unit 14 (S141).

The determination of step S141 is then repeated. Although no match is found in the memory unit 14 using the designated running number (No. N, N being an integer two or greater), when matching is found by comparing the designated running number with the running number preceding (N−1) or following (N+1) in the memory unit 14 (Yes in S142), a notification is made to the effect that no content corresponding to the designated running number exists on the server (S143). Furthermore, the determination unit 20 stops the acquisition process by the metadata acquisition unit 18 (S144).

Figure 15:
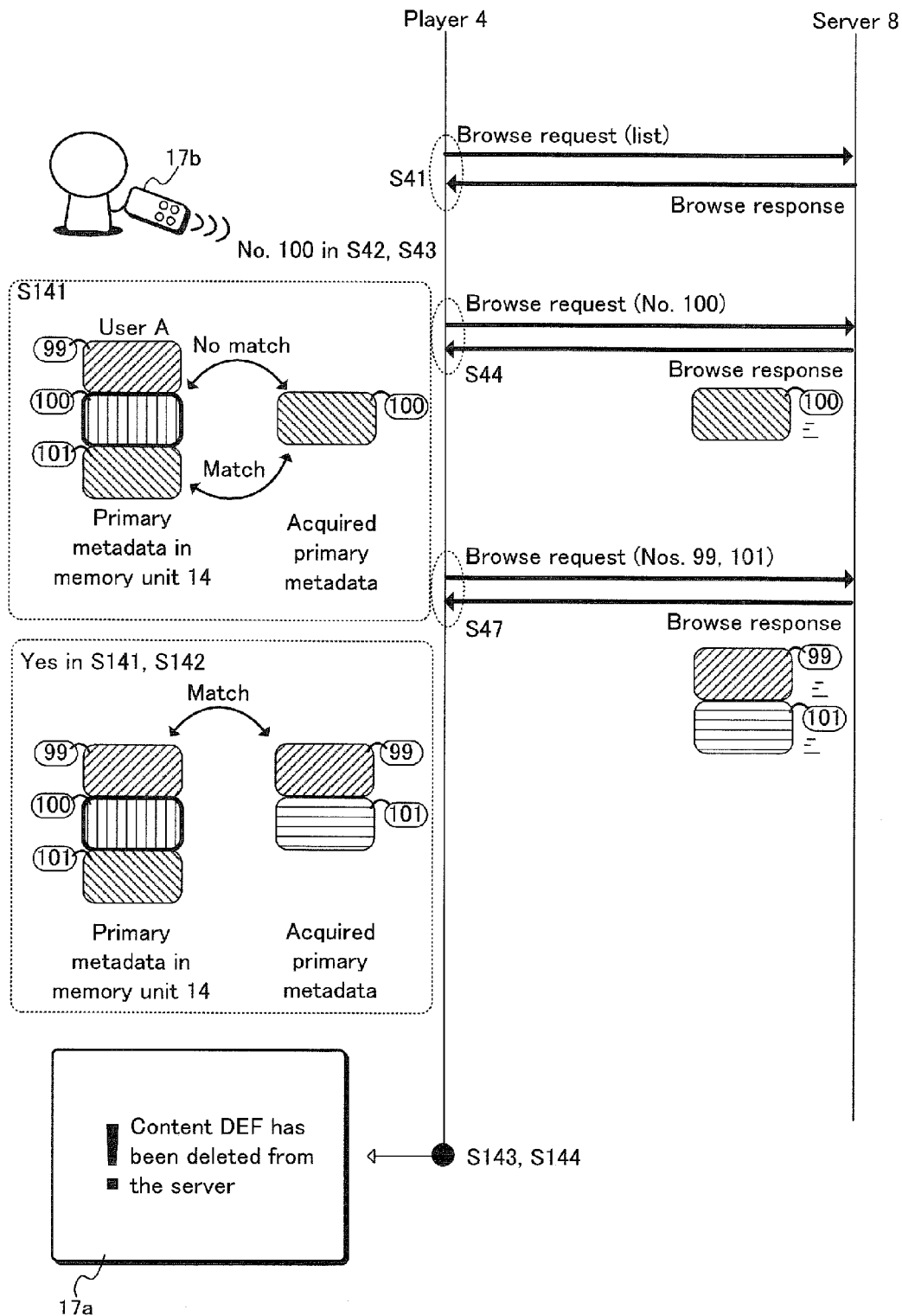
FIG. 15 is a sequence diagram of the player 4 and the server 8.

A specific explanation follows, with reference to FIG. 15. Although matching can be found by comparing running numbers 101 and 99 in the memory unit 14 of player 4, no comparison is made using No. 100. Thus, the server 8 establishes that no content corresponds to running number 100. Accordingly, the user may be immediately notified, which is an improvement to the user experience. Further, subsequent futile repetitions of the acquisition process are avoided by stopping the acquisitions by the metadata acquisition unit 18 at this time.

(3) Sorting Criteria

Ordinarily, the primary metadata for the content managed by the server 8 are arranged according to sorting criteria and have running numbers affixed. The sorting criteria are defined by user settings or similar, and may use the content title, rate, date created, date added, and the like.

The running number decision methods for the second and subsequent acquisitions described above as variations (1)(a) through (1)(e) are optimizable using the sorting criteria.

For example, let the sorting criteria be set such that content is sorted in ascending order of addition date. As such, while the running numbers of the primary metadata may be shifted up, downward shifts are unlikely (because newly-added content has the most recent addition date and should therefore have the last running number). Therefore, decision method (1)(c), described above, is ideal for such circumstances.

In contrast, when the sorting criteria are such that content is sorted in descending order of addition date, decision method (1)(a) is preferable.

(4) Folders

Although not detailed in the above Embodiments, the synchronization unit 12 may also receive information pertaining to folders storing the content managed by the server 8.

The user interface unit 16 may then display the folder-related information so received for use in refining content searches or similar.

The metadata acquisition unit 18 may also acquire metadata designating a folder in addition to the running number (e.g., designate No. 100 in a folder named video/my_favorites/2010/05).

(5) Primary Metadata

In the Embodiments, the primary metadata are described as including three items, namely the title, genre, and artist. However, no limitation is intended.

Any metadata enabling the user to search the content may be used. As listed beginning on page 125 of Non-Patent Literature 2, properties such as actor, author, producer, publisher, description, episode number, and so on, may be used.

Relevant primary metadata are displayed to the user to assist in content searching, and may thus be called search metadata.

Also, the comparison made in step S45 need not necessarily involve all items of the primary metadata. A subset of items may also be used.

When relatively few items are used, matches are determined with reduced precision (e.g., various content may likely have the same genre). The number of primary metadata items used for match determination should therefore be increased to a certain level.

(6) Secondary Metadata

In Embodiment 2, the secondary metadata are described as having six items, such as the content URI 34a of FIG. 8. However, no limitation is intended.

Any metadata enabling content playback may be used. As listed beginning on page 120 of Non-Patent Literature 2, properties such as duration, sample frequency, resolution, color depth, and so on may be used.

Relevant secondary metadata indicate the playback format for content and may thus be called playback metadata.

(7) User Notification

In the Example illustrated by FIG. 15, the notification of step S143 involves the determination unit 20 displaying a message on the display 17a via the user interface unit 16, the message reading "Content DEF has been deleted from the server". The notification is not limited to such a display. Any format recognizable by the user may be used.

Also, the order of steps S143 and S144 in the flowchart of FIG. 14 is freely variable. In addition, either one of steps S143 and S144 may be skipped entirely.

(8) Content Searching Device

Although FIG. 2 indicates that the user interface unit 16 of player 4 receives a running number designation from the remote control 17b, no limitation is intended. A mouse, control button, or any other input interface may also be used for the same purpose. In FIG. 2, a content searching device 100 is indicated by a dotted line around the components of player 4.

(9) Content Format

In the Embodiments, the content is described as being video content. However, the Embodiments are widely applicable not only to video but also to audio and image content.

(10) Synchronization Conditions

In the Embodiments, player 4 power supply initiation is given as the synchronization condition. However, no limitation is intended. A predetermined date and time may be scheduled in advance, or user instructions may be used.

In addition, the synchronization condition may occur immediately before the list display in step S42 (FIG. 4). In such circumstances, the running number information managed by the server 8 may still be modified while waiting for reception in step S43.

(11) Program

The above Embodiments describe the operations and so on of processors for various information processing devices, as well control programs made up of program code executed by the various circuits connected to such processors. These programs may be recorded on a recording medium or transmitted and distributed via various communication channels.

The recording medium may be any non-transitory recording medium, such as an IC card, hard disk, optical disc, floppy disc, ROM, and so on.

The control program so transmitted and distributed is provided for use by being stored in processor-readable memory or similar. The processor then realizes the functions described in the Embodiments by executing the control program.

(12) LSI

The functional blocks of FIG. 2 and the like may be realized as integrated circuits in the form of LSIs. The components may each be realized as individual chips, or may be realized in whole or in part as a single chip. Although LSI is named above, the terms IC, system LSI, super LSI, and ultra LSI may be used, according to the degree of integration.

Further, the integrated circuit method is not limited to LSI. A private circuit or a general-purpose processor may also be used. After LSI manufacture, a FPGA (Field Programmable Gate Array) or reconfigurable processor may also be used. Furthermore, future developments may lead to technology enhancing or surpassing semiconductor technology. Such developments may, of course, be applied to the integration of all functions.

(Supplement 2)

The Embodiments include the following aspects.

(1) A content searching device pertaining to the present invention uses a given running number to search for a piece of content on a server having a first database in which pieces of the content are associated with running numbers and with primary metadata describing the corresponding pieces of the content, the content searching device comprising: a memory unit storing a second database corresponding to the first database; a synchronization unit receiving information from the server when a synchronization condition is met and synchronizing the second database with the first database according to the information so received, the information pertaining to the running numbers and to the primary metadata in the first database; a reception unit receiving a designation of the given running number from a user, the designation being made from the running numbers in the second database; a metadata acquisition unit using the given running number so designated to acquire a corresponding piece of the primary metadata from the server; and a determination unit making, for every acquisition, a comparison between (i) the piece of the primary metadata and (ii) a piece of the primary metadata corresponding to the given running number in the second database, so as to determine matching, wherein when the determination unit determines no matching, the metadata acquisition unit uses another running number proximal to the given running number to further acquire another piece of the primary metadata from the server, and the content searching device further comprises: a content acquisition unit acquiring a piece of the content corresponding to the other running number from the server when the determination unit determines matching in the comparison made using the piece of the primary metadata corresponding to the other running number; and a playback unit playing back the piece of the content acquired by the content acquisition unit.

(2) The content searching device may also have the metadata acquisition unit use a running number not used for acquisition thus far as the other running number when further acquiring the other piece of the primary metadata, making successive acquisitions until the determination unit determines matching.

(3) Alternatively, in the content searching device, when the given running number received by the reception unit is Nth in the second database, N being an integer no smaller than two, the determination unit makes, for every acquisition by the metadata acquisition unit, the comparison between (i) the piece of the primary metadata and (ii) each of three pieces of the primary metadata in the second database, the three pieces being N−1th, Nth, and N+1th, so as to determine matching, and further acquisitions by the metadata acquisition unit are stopped when, as a result of successive determinations, the determination unit determines no matching in the determination made using the Nth piece of the primary metadata in the second database but determines matching in the determination made using the N−1th and N+1th pieces of the primary metadata in the second database.

Accordingly, the processing required for metadata acquisition is diminished.

(4) Further, in the content searching device, when the given running number received by the reception unit is Nth in the second database, N being an integer no smaller than two, the determination unit makes, for every acquisition by the metadata acquisition unit, the comparison between (i) the piece of the primary metadata and (ii) each of three pieces of the primary metadata in the second database, the three pieces being N−1th, Nth, and N+1th, so as to determine matching, and the content searching device further comprises a notification unit notifying the user that no piece of content corresponding to running number N is found on the server when, as a result of successive determinations, the determination unit determines no matching in the determination made using the Nth piece of the primary metadata in the second database but determines matching in the determination made using the N−1th and N+1th pieces of the primary metadata in the second database.

Accordingly, improvements to the user experience are provided.

(5) Also, in the content searching device, when the given running number received by the reception unit is Nth in the second database, N being an integer no smaller than two, the metadata acquisition unit uses the Nth running number to acquire the piece of the primary metadata, the metadata acquisition unit uses the N−1th running number to acquire a successive piece of the primary metadata when the determination unit determines no matching using a previously acquired piece of the primary metadata, the metadata acquisition unit uses the N−2th running number to acquire a next successive piece of the primary metadata when the determination unit again determines no matching using the previously acquired piece of the primary metadata, and the metadata acquisition unit successively uses the N−3th, N−4th, . . . running numbers, shifting up through the running numbers one at a time to acquire each successive piece of metadata until the determination unit determines matching.

(6) Furthermore, in the content searching device, when the given running number received by the reception unit is Nth in the second database, N being an integer no smaller than two, the other running number used by the content acquisition unit is the N−1th.

(7) In addition, in the content searching device, when the given running number received by the reception unit is Nth in the second database, N being an integer no smaller than two, the other running number used by the content acquisition unit is the N−1th and N+1th.

(8) Further still, the metadata acquisition unit performs the acquisition by transmitting a browse request to the server, in conformity with DLNA (Digital Living Network Alliance) guidelines.

(9) Additionally, the first database includes the running numbers, the primary metadata, and secondary metadata indicating a playback format, assigned to each piece of the content, the second database includes the running numbers and the primary metadata assigned to each piece of the content, the synchronization by the synchronization unit applies to the running numbers and the primary metadata of the first database, but does not apply to the secondary metadata, the metadata acquisition unit acquires the secondary metadata as well as the primary metadata, and the playback unit plays back the piece of content acquired by the content acquisition unit in accordance with the playback format indicated by the secondary metadata that corresponds to the piece of content acquired by the metadata acquisition unit.

(10) A content searching method pertaining to the present invention comprises a storage step of storing, in a memory unit, a second database corresponding to a first database on a server in which pieces of content are associated with running numbers and with primary metadata describing the corresponding pieces of the content; a synchronization step of receiving information from the server when a synchronization condition is met and synchronizing the second database with the first database according to the information so received, the information pertaining to the running numbers and to the primary metadata in the first database; a reception step of receiving a designation of the given running number from a user, the designation being made from the running numbers in the second database; a first determination step of making a comparison between (i) the piece of the primary metadata and (ii) a piece of the primary metadata corresponding to the given running number in the second database, so as to determine matching; a proximal metadata acquisition step of using another running number proximal to the given running number to acquire another piece of the primary metadata from the server when the determination unit determines no matching; a second determination step of making a comparison between (i) the other piece of the primary metadata and (ii) a piece of the primary metadata corresponding to the given running number in the memory unit, so as to determine matching; a content acquisition step of acquiring a piece of the content corresponding to the other running number from the server when matching is determined in the second determination step; and a playback step of playing back the piece of the content acquired by the content acquisition unit.

(11) A content searching program pertaining to the present invention causes a content searching device to execute a content searching process, the content searching process comprising: a storage step of storing, in a memory unit, a second database corresponding to a first database on a server in which pieces of content are associated with running numbers and with primary metadata describing the corresponding pieces of the content; a synchronization step of receiving information from the server when a synchronization condition is met and synchronizing the second database with the first database according to the information so received, the information pertaining to the running numbers and to the primary metadata in the first database; a reception step of receiving a designation of the given running number from a user, the designation being made from the running numbers in the second database; a first determination step of making a comparison between (i) the piece of the primary metadata and (ii) a piece of the primary metadata corresponding to the given running number in the second database, so as to determine matching; a proximal metadata acquisition step of using another running number proximal to the given running number to acquire another piece of the primary metadata from the server when the determination unit determines no matching; a second determination step of making a comparison between (i) the other piece of the primary metadata and (ii) a piece of the primary metadata corresponding to the given running number in the memory unit, so as to determine matching; a content acquisition step of acquiring a piece of the content corresponding to the other running number from the server when matching is determined in the second determination step; and a playback step of playing back the piece of the content acquired by the content acquisition unit.

The present invention is applicable to the provision of enhanced accuracy in content searches for a content searching device.

REFERENCE SIGNS LIST

4 Player
8 Server
12 Synchronization unit
14 Memory unit
16 User interface unit
18 Metadata acquisition unit
20 Determination unit
22 Content acquisition unit
24 Content playback unit
30 Running number
32 Primary metadata
34 Secondary metadata
48 Metadata acquisition unit
56 Metadata memory unit

The invention claimed is:

1. A content searching device, comprising:
a memory unit storing a second database corresponding to a first database provided on a server, in which pieces of content are associated with running numbers and with primary metadata describing the corresponding pieces of the content;
a synchronization unit receiving information from the server when a synchronization condition is met and synchronizing the second database with the first database according to the information received, the information pertaining to the running numbers and to the primary metadata in the first database;
a reception unit receiving a designation of a given running number from a user, the designation being made from the running numbers in the second database;
a metadata acquisition unit using the given running number so designated to acquire a corresponding piece of the primary metadata from the server; and
a determination unit making, for every acquisition, a comparison between (i) the piece of the primary metadata and (ii) a piece of the primary metadata corresponding to the given running number in the second database, so as to determine matching, wherein when the determination unit determines no matching, the metadata acquisition unit uses another running number proximal to the given running number to further acquire another piece of the primary metadata from the server, and
the content searching device further comprises: a content acquisition unit acquiring a piece of the content corresponding to the other running number from the server when the determination unit determines matching in the comparison made using the piece of the primary metadata corresponding to the other running number; and
a playback unit playing back the piece of the content acquired by the content acquisition unit, wherein
the server has the first database;
upon addition of a piece of the primary metadata corresponding to the given running number, the first database on the server shifts downward all later running numbers associated with pieces of the primary metadata; and
upon deletion of a piece of the primary metadata corresponding to the given running number, the first database on the server shifts upward all earlier running numbers associated with pieces of the primary metadata.

2. The content searching device of claim 1, wherein
the metadata acquisition unit uses a running number not used for acquisition thus far as the other running number when further acquiring the other piece of the primary metadata, making successive acquisitions until the determination unit determines matching.

3. The content searching device of claim 2, wherein
when the given running number received by the reception unit is Nth in the second database, N being an integer no smaller than two,
the determination unit makes, for every acquisition by the metadata acquisition unit, the comparison between (i) the piece of the primary metadata and (ii) each of three pieces of the primary metadata in the second database, the three pieces being N−1th, Nth, and N+1th, so as to determine matching, and
further acquisitions by the metadata acquisition unit are stopped when, as a result of successive determinations, the determination unit determines no matching in the determination made using the Nth piece of the primary metadata in the second database but determines matching in the determination made using the N−1th and N+1th pieces of the primary metadata in the second database.

4. The content searching device of claim 2, wherein
when the given running number received by the reception unit is Nth in the second database, N being an integer no smaller than two,
the determination unit makes, for every acquisition by the metadata acquisition unit, the comparison between (i) the piece of the primary metadata and (ii) each of three pieces of the primary metadata in the second database, the three pieces being N−1th, Nth, and N+1th, so as to determine matching, and
the content searching device further comprises a notification unit notifying the user that no piece of content corresponding to running number N is found on the server when, as a result of successive determinations, the determination unit determines no matching in the determination made using the Nth piece of the primary metadata in the second database but determines matching in the determination made using the N−1th and N+1th pieces of the primary metadata in the second database.

5. The content searching device of claim 2, wherein
when the given running number received by the reception unit is Nth in the second database, N being an integer no smaller than two,
the metadata acquisition unit uses the Nth running number to acquire the piece of the primary metadata,
the metadata acquisition unit uses the N−1th running number to acquire a successive piece of the primary metadata when the determination unit determines no matching using a previously acquired piece of the primary metadata,
the metadata acquisition unit uses the N−2th running number to acquire a next successive piece of the primary metadata when the determination unit again determines no matching using the previously acquired piece of the primary metadata, and
the metadata acquisition unit successively uses the N−3th, N−4th, running numbers, shifting up through the running numbers one at a time to acquire each successive piece of metadata until the determination unit determines matching.

6. The content searching device of claim 1, wherein
when the given running number received by the reception unit is Nth in the second database, N being an integer no smaller than two,
the other running number used by the content acquisition unit is the N−1th.

7. The content searching device of claim 1, wherein
when the given running number received by the reception unit is Nth in the second database, N being an integer no smaller than two,
the other running number used by the content acquisition unit is the N−1th and N+1th.

8. The content searching device of claim 1, wherein
the metadata acquisition unit performs the acquisition by transmitting a browse request to the server, in conformity with DLNA (Digital Living Network Alliance) guidelines.

9. The content searching device of claim 1, wherein
the first database includes the running numbers, the primary metadata, and secondary metadata indicating a playback format, assigned to each piece of the content,
the second database includes the running numbers and the primary metadata assigned to each piece of the content, the synchronization by the synchronization unit applies to the running numbers and the primary metadata of the first database, but does not apply to the secondary metadata, the metadata acquisition unit acquires the secondary metadata as well as the primary metadata, and the playback unit plays back the piece of content acquired by the content acquisition unit in accordance with the playback format indicated by the secondary metadata that corresponds to the piece of content acquired by the metadata acquisition unit.

10. A content searching method, comprising:

a storage step of storing, in a memory unit, a second database corresponding to a first database on a server in which pieces of content are associated with running numbers and with primary metadata describing the corresponding pieces of the content;

a synchronization step of receiving information from the server when a synchronization condition is met and synchronizing the second database with the first database according to the information received, the information pertaining to the running numbers and to the primary metadata in the first database;

a reception step of receiving a designation of a given running number from a user, the designation being made from the running numbers in the second database;

a first determination step of making a comparison between (i) the piece of the primary metadata and (ii) a piece of the primary metadata corresponding to the given running number in the second database, so as to determine matching;

a proximal metadata acquisition step of using another running number proximal to the given running number to acquire another piece of the primary metadata from the server when the determination unit determines no matching;

a second determination step of making a comparison between (i) the other piece of the primary metadata and (ii) a piece of the primary metadata corresponding to the given running number in the memory unit, so as to determine matching;

a content acquisition step of acquiring a piece of the content corresponding to the other running number from the server when matching is determined in the second determination step; and a playback step of playing back the piece of the content acquired by the content acquisition unit, wherein the server has the first database; upon addition of a piece of the primary metadata corresponding to the given running number, the first database on the server shifts downward all later running numbers associated with pieces of the primary metadata; and upon deletion of a piece of the primary metadata corresponding to the Riven running number, the first database on the server shifts upward all earlier running numbers associated with pieces of the primary metadata.

11. A non-transitory computer-readable recording medium storing a content searching program for causing a content searching device to execute a content searching process, the content searching process comprising:

a storage step of storing, in a memory unit, a second database corresponding to a first database on a server in which pieces of content are associated with running numbers and with primary metadata describing the corresponding pieces of the content;

a synchronization step of receiving information from the server when a synchronization condition is met and synchronizing the second database with the first database according to the information received, the information pertaining to the running numbers and to the primary metadata in the first database;

a reception step of receiving a designation of a given running number from a user, the designation being made from the running numbers in the second database;

a first determination step of making a comparison between (i) the piece of the primary metadata and (ii) a piece of the primary metadata corresponding to the given running number in the second database, so as to determine matching;

a proximal metadata acquisition step of using another running number proximal to the given running number to acquire another piece of the primary metadata from the server when the determination unit determines no matching;

a second determination step of making a comparison between (i) the other piece of the primary metadata and (ii) a piece of the primary metadata corresponding to the given running number in the memory unit, so as to determine matching;

a content acquisition step of acquiring a piece of the content corresponding to the other running number from the server when matching is determined in the second determination step; and a playback step of playing back the piece of the content acquired by the content acquisition unit, wherein the server has the first database; upon addition of a piece of the primary metadata corresponding to the given running number, the first database on the server shifts downward all later running numbers associated with pieces of the primary metadata; and upon deletion of a piece of the primary metadata corresponding to the given running number, the first database on the server shifts upward all earlier running numbers associated with pieces of the primary metadata.

* * * * *